Oct. 31, 1950 J. VAN V. ELSWORTH 2,527,920
CIRCUIT FAILURE PROTECTION DEVICE
Filed June 23, 1949 4 Sheets-Sheet 3

Inventor
John V. V. Elsworth
By
Dodge & Im.
Attorneys

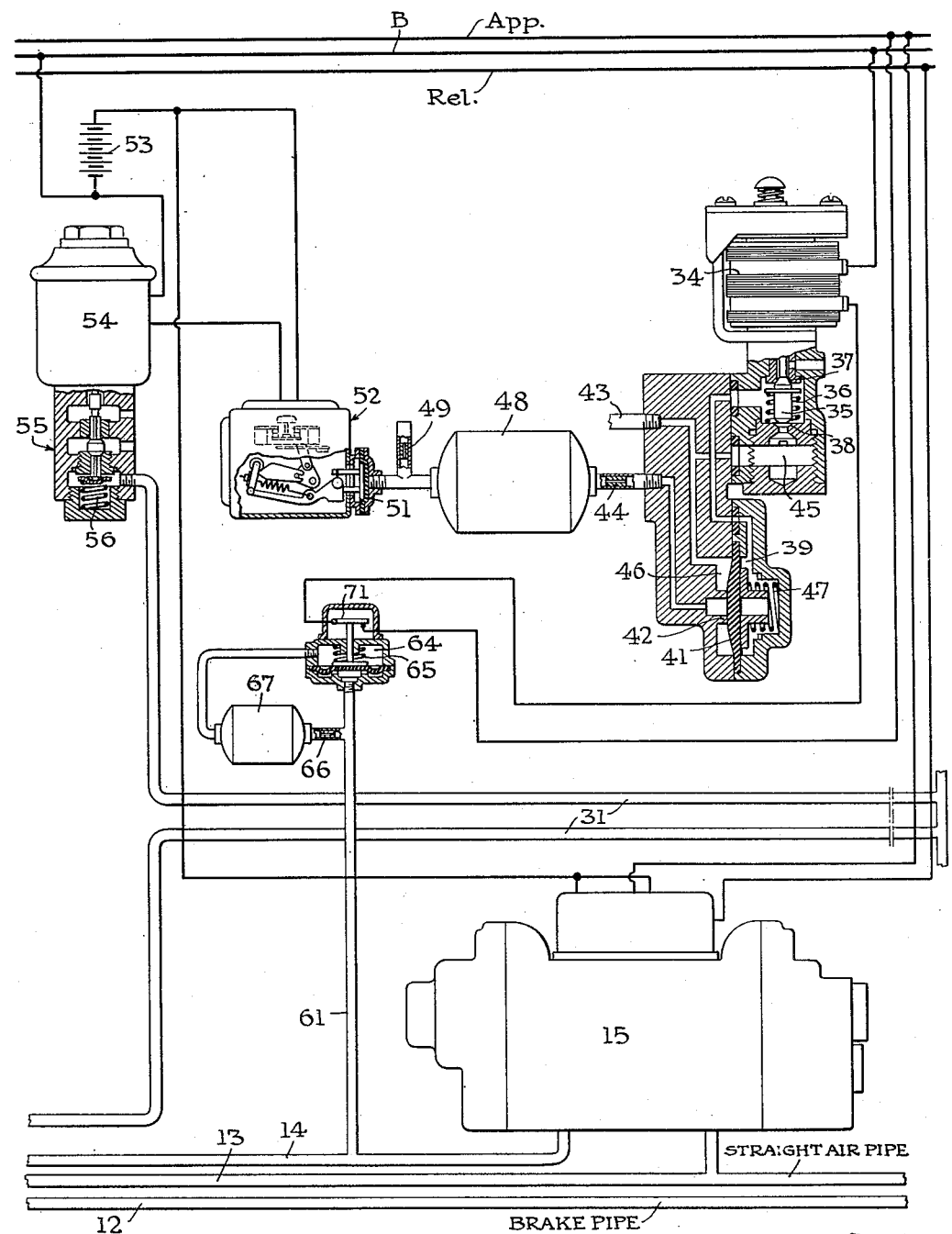

Patented Oct. 31, 1950

2,527,920

UNITED STATES PATENT OFFICE 2,527,920

CIRCUIT FAILURE PROTECTION DEVICE

John Van Varick Elsworth, Watertown, N. Y., assignor to The New York Air Brake Company, a corporation of New Jersey Application June 23, 1949, Serial No. 100,928

10 Claims. (Cl. 303—26)

This invention relates to air brakes and particularly to safety systems for electro-pneumatic brakes, and simply as a basis for disclosure will be described as used on the 24 R L Brake which is a standard commercial brake.

Basically this is a dual brake system, in which a complete automatic brake system and a complete electro-pneumatic straight air system exist side by side throughout the train. They operate the same brake cylinders through the same relays. They are controlled by the same engineer's brake valve, which may be set to operate the straight air system or the automatic system simply by shifting a two-position selector.

A few characteristics are of present importance, and will be mentioned. The automatic brake pipe retains all its usual characteristics. Hence, a break-in-two will inevitably cause an emergency application. This major safety factor is always present. Moreover, no matter how the selector is set, the engineer's brake valve always has one and the same emergency position, which will produce an automatic emergency application. Hence, the second major safety factor, characteristic of automatic operation, is always available, and available in the position used since the adoption of the equalizing discharge valve. Both major safety characteristics of automatic braking being always present, and in no way dependent on any electrical function or straight air function, the system loses nothing by the presence of the electro-pneumatic straight air-system.

There are, however, psychological possibilities which it is desirable to take into account, to meet and guard against human failure. The straight-air pipe is divided into car length units by chokes, though it is connected continuously throughout the train. The pressure in each unit is controlled by an electrically actuated inlet valve and an electrically actuated discharge valve. All such units are controlled by a master controller located at the head of the train. Since it is impracticable to operate the electrical part of the system on a closed circuit basis, the electrical part of the system cannot have a "fail safe" characteristic, and since the car-lengths of the straight air pipe are semi-isolated, units comprising more than one car, cannot be properly controlled by adjacent cars, in the event of failure of some electrically operated valve.

Trains equipped with this system are customarily operated on the straight-air side of the system. If, under high speed conditions, an engineer attempts to make an application and fails to get the expected application, he should do either of two things:

1. Shift the selector, and brake on the automatic principle using the same brake valve, or 2. Simply move the brake valve to automatic emergency position.

Surprise under stress paralyzes some men, and it is feared that an engineer might fail to adopt either of these instantly available possibilities.

To guard against such a possibility elaborate checking systems have been devised. These continuously check the circuits, and indicate failure, so that the engineer will be forewarned (in case of circuit failure) to shift the selector to "automatic." If, having neglected to do so after failure is indicated, he attempts a straight-air application, he will initiate an automatic application which he cannot release until he does carry out certain change-over manipulations. Ingenious as such checking systems are, and despite their theoretical value, the complication is great and their desirability has been questioned.

The present invention attains the objective by much simpler means and is based on a simple fundamental premise, which is: Any derangement of the straight-air system, and particularly derangement occurring in the electric circuits thereof, will cause cyclic functioning of the master controller. The invention avails of this circumstance and provides means (preferably largely pneumatic) which will respond only to such cyclic functioning and upon such response will actuate any preferred signal, brake applying valve or other safety device.

It is preferred to operate an application valve, because the device of the invention can be made indifferent to minor faults, so that automatic stopping will result only from a serious derangement of the system.

As stated the invention will be described as embodied in the 24-RL brake equipment. The brake equipment is complicated but the invention is relatively simple. To facilitate disclosure of the invention and to avoid discussion of the complexities of the 24-RL brake equipment, there is filed with this application a copy of The New York Air Brake Company's Instruction Pamphlet No. 59 dated May 1948 and entitled "24-RL Brake Equipment."

On Plate A-1 in this book there are added in red the significant electric circuit connections and the pneumatic components used according to applicant's inventon. In the drawings accompanying the present application, components of the 24-RL system which do not participate in the operation of the invention are omitted, so far as circumstances permit.

The 24-RL brake equipment is approved for use on American railroads, and is in extensive commercial use. Consequently, it is deemed to be well known to persons skilled in the air brake art. The instruction pamphlet is filed to make a permanent record of this system as it is now, and was at the time of applicant's invention. There are various patented systems which resemble the 24-RL system without being identical therewith.

The fact that applicant's invention can be used in the same or similar forms with such other systems is recognized.

In the drawings:

Figs. 1 and 2 when assembled end to end in the order stated form a diagram of that portion of the 24-RL system which is affected by the invention and shows the components of the invention intercalated in the system.

Fig. 4 is a view simlar to Fig. 3 showing a modified arrangement which is functionally the equivalent of that shown in Fig. 3.

Figure 1:
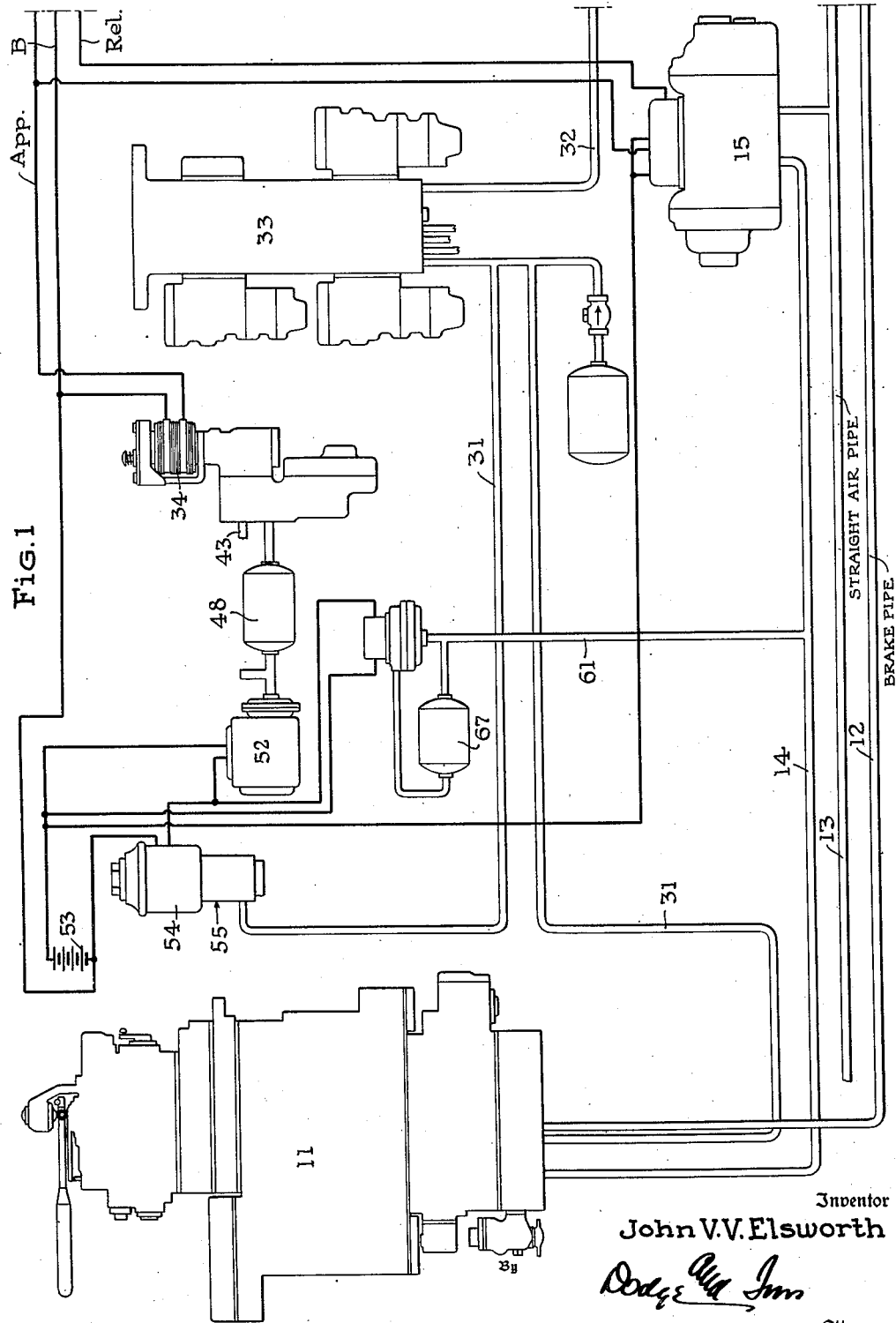
Figure 2:
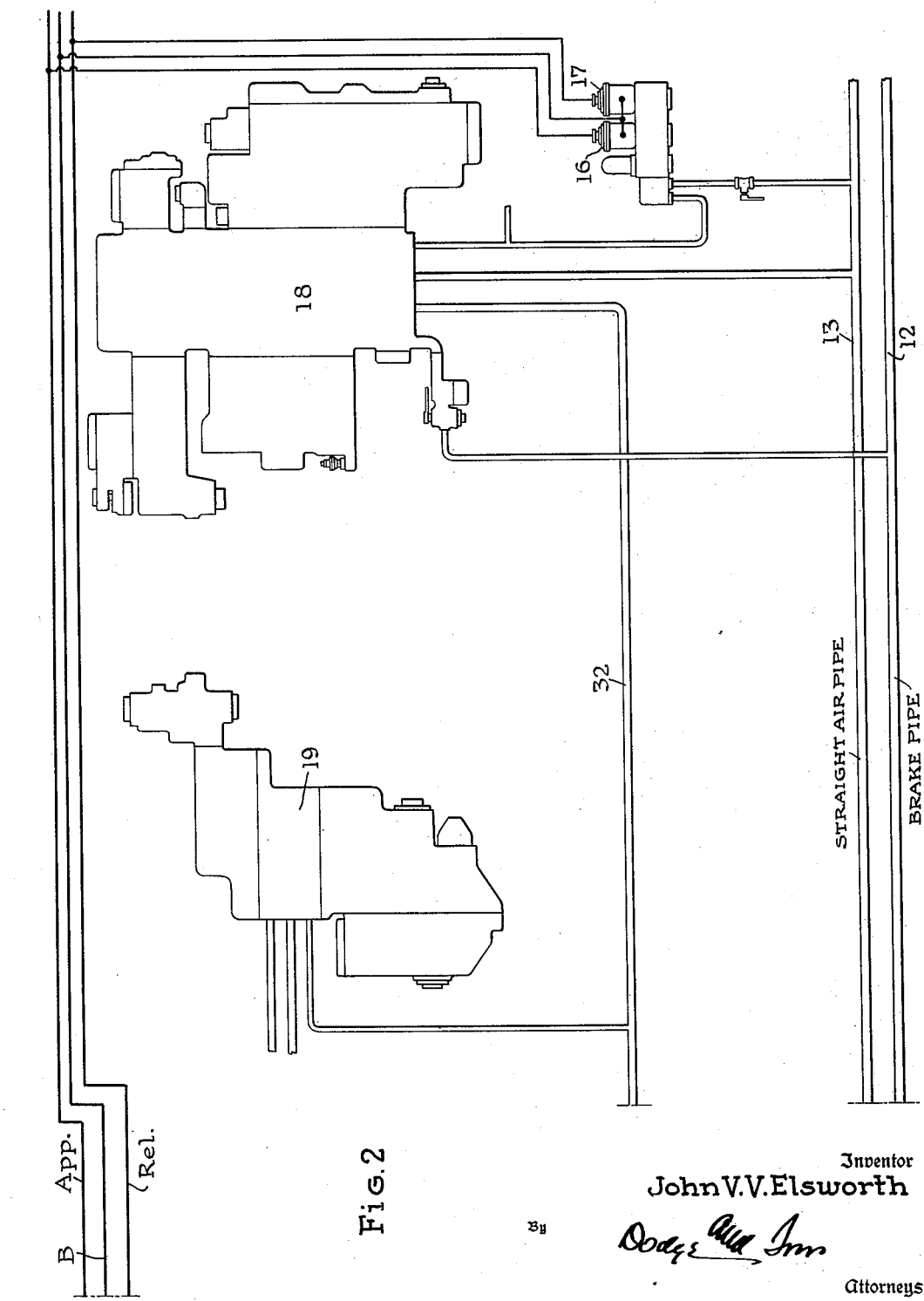

Refer now to Figs. 1 and 2. The engineer's brake valve is indicated in elevation at 11 and as is well known includes a service application valve. The engineer's brake valve is convertible for operation selectively on the straight air and automatic principles, and when set for operation on the automatic principle operates the brakes by controlling the pressure in the normally charged brake pipe 12. When set to operate on the electro-pneumatic straight air principle, the engineer's brake valve 11 controls the pressure in the straight air pipe 13. It does not do so directly. On the contrary the engineer's brake valve 11 controls directly the pressure in a pipe 14 which in the parlance of the art has come to be known as the "number eleven" pipe because the number "11" is cast on the pipe bracket of the engineer's brake valve for identifying purposes. "Control pipe" is an apt descriptive term for this pipe.

The pressure in pipe 14 controls the operation of a master controller 15 and the master controller operates admission and relief magnet valves throughout the train to apply and release the brakes. One application magnet valve is shown at 16 and the corresponding release magnet valve at 17 in Fig. 2. They are associated in pairs with a control valve 18 and a brake cylinder relay 19 also included in Fig. 2. Their primary function, so far as electro-pneumatic straight air operation is concerned, is to establish and dissipate desired pressures through the length of the straight air pipe 13. They function in a manner well known in the art to accomplish this result.

The magnet valves are controlled by the controller 15 through a three-wire circuit which extends throughout the train and comprises the B wire designated throughout by the letter B, the application wire designated throughout by the legend App. and the release wire similarly designated by the legend Rel. The master controller 15 is shown in secton in Fig. 3.

The pipe 14 leads to a chamber 21 at the left of an actuating diaphragm 22. The straight air pipe leads to a chamber 23 at the right of a neutralizing or follow-up diaphragm 24. The centers of the diaphragms are connected together by a rod 25 whose motion actuates switches hereinafter mentioned. If pressure in pipe 14 is raised, diaphragm 22 moves to the right against the resistance of a biasing spring 26. If pressure is immediately developed in the straight air pipe 13 (as should be the case), pressure in chamber 23 balances that in 21 and the spring 26 moves the rod 25 and the diaphragms in the reverse direction.

After pressure has been established in the straight air pipe, lowering of the pressure in the pipe 14 and consequently in chamber 21 will cause a further reverse movement of the diaphragms.

Rod 25 carries a collar 27 which actuates the application switch arm 28 and the release switch arm 29 simultaneously both in circuit closing directions. The coacting contacts are so contrived that the effect is first to energize and close the release magnet valve 17 and thereafter energize and open the application magnet valve 16. That, of course, is what produces the rise of pressure in the straight-air pipe 13. Under "lap" conditions the release magnet valve remains energized but the application magnet valve is de-energized.

It is apparent from what has just been said that if an engineer attempts to make an application, and there is a break in the straight-air pipe or a serious leak therefrom, or if release magnet valves fail to function or application magnet valves fail to function, there will be a disturbance of the operation of the master controller 15. Malfunctions short of complete circuit failure (against which other safeguards are interposed), cause the master controller 15 to cycle, that is, cause it to reciprocate or operate recurrently. The invention makes use of this recurrent operation or cycling to operate the service application valve, already present in the system, to cause an automatic service application.

Operation of the service application valve is effectuated by venting a pipe 31 known in the industry as the "number ten pipe." So far as here material, the venting of the pipe 31 produces an automatic service application. The term "automatic" is here used in the technical sense to mean a brake application produced by the automatic side of the system.

The pipe 32 on Figs. 1 and 2 is the so-called "number sixteen pipe," and leads to the number sixteen connection in control valve 18. The "relayair" valve 33 shown connected to pipes 31 and 32 serves to exercise certain special functions notably overspeed control, and has no bearing on the present invention.

Figure 3:
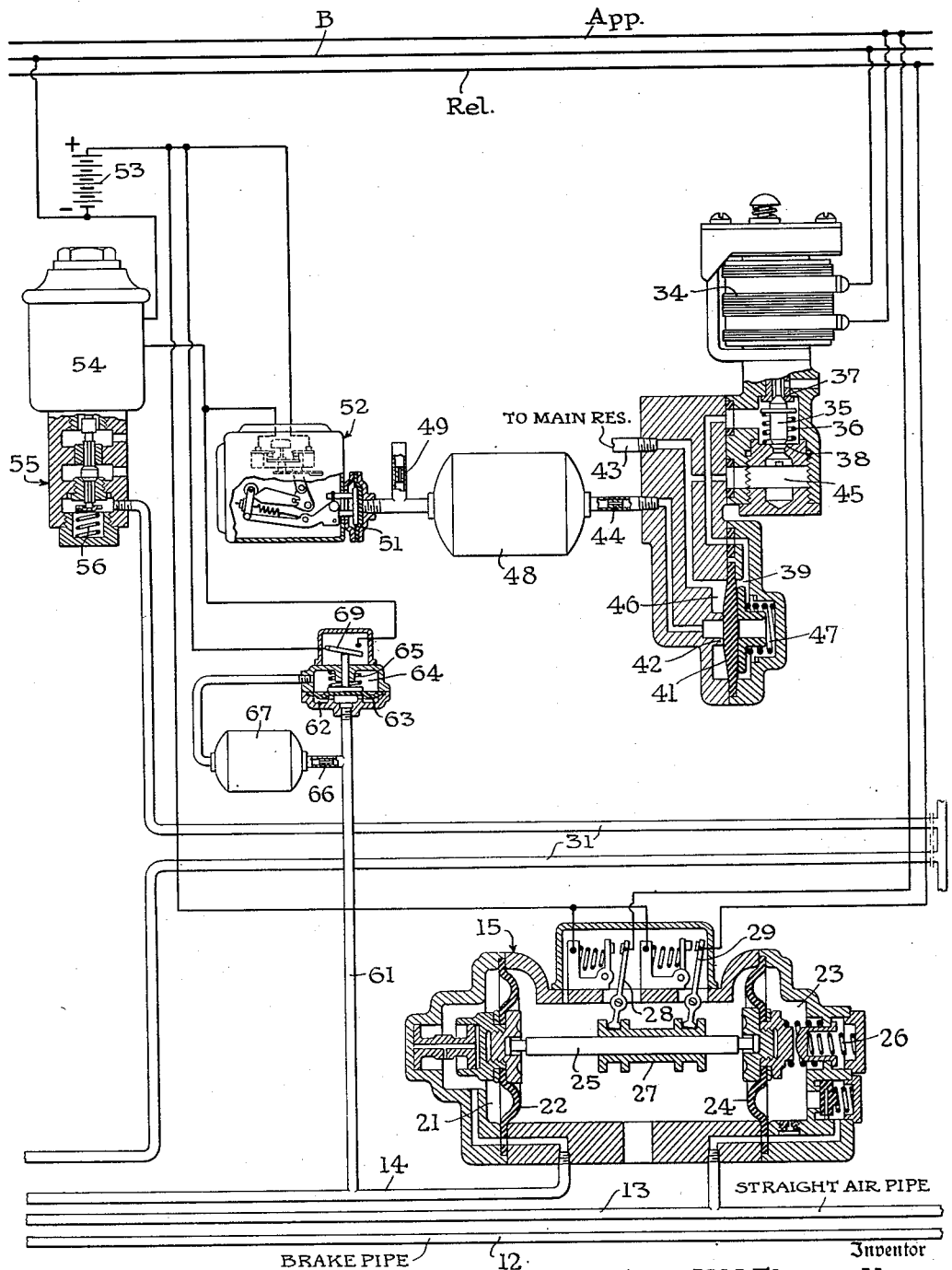
Fig. 3 is a view on a larger scale and chiefly in section of that portion of Fig. 1 which includes applicant's invention. The view is thus a sectional diagram of the basic components used by applicant in applying his invention to this brake system.

Refer now to Fig. 3. A winding 34 is connected between the line B and the application line so that every time the master controller 15 functions, the winding 34 is energized. The armature in the winding 34 operates a double beat poppet valve 35, which is biased by a coil compression spring 36 toward an exhaust seat 37 and away from an inlet seat 38. The valve 35 controls the pressure in the chamber 39 behind a combined flexible diaphragm and valve 41.

The valve seats against an annular seat 42 and controls flow from a main reservoir connection 43 to a choke 44. Main reservoir pressure from the connection 43 is always present in the space 45 beneath the inlet seat 38 and is also present in the annular space 46 to the left of the diaphragm 41. The diaphragm 41 is biased toward its seat by a coil compression spring 47.

Thus, when winding 34 is de-energized, diaphragm valve 41 closes but each time that winding 34 is energized the valve 41 opens. It stays open as long as the winding 34 is energized. It then supplies air to the choke 44, and this air is admitted to a small reservoir or accumulator volume 48 which is constantly vented to atmosphere through a choke 49. The sizes of the chokes 44 and 49 are so coordinated that the choke 49 will substantially dissipate pressure in the volume 48 except in cases where winding 34 is energized with a frequency high enough to indicate derangement of the system. Pressure so developed in the volume 48 reacts on the motor diaphragm 51 of the normally closed pressure switch generally indicated by the numeral 52.

The source of current for the lines App., B and Rel. is typified by the battery 53 and the switch 52 is arranged to control a circuit from this battery through the winding 54 of a magnet valve generally indicated at 55. The valve 55 is biased to open by a coil compression spring 56 and when opened vents the pipe 31. It follows that the winding 54 is constantly energized and holds the valve 55 closed, and that maintained closure is dependent on integrity of the circuit. The switch 52 is normally closed but will be opened if the reservoir 48 is charged. Thus, excessive cycling of the master controller 15 causes charging of the reservoir 48 and an excessive charging rate opens the switch 52, causes the valve 55 to open and thus vents the pipe 31.

Venting of the pipe 31 produces an automatic service application which is beyond the control of the engineer and which warns him that the electro-pneumatic system is seriously deranged. If he cannot discover and correct the defect, all he has to do is to convert his engineer's brake valve 11 to automatic operation and proceed on the automatic principle.

Experimental use of this scheme developed the need of one safeguard. It was found that if the engineer initially made a heavy service application so that the master controller valve 15 remained in application position for a considerable length of time, he might charge the reservoir 48 sufficiently to operate the switch 52.

To eliminate this possibility a connection 61 was made to pipe 14 and led to the lower chamber 62 of a differential diaphragm mechanism which includes a flexible diaphragm 63 and an upper chamber 64 above this diaphragm. A biasing spring 65 was used to hold the diaphragm normally in its lower position.

A choked connection 66 was led from the line 61 to a small volume chamber 67 which in turn was in free communication with the chamber 64. From the construction just described it follows that when pipe 14 is initially put under pressure, the diaphragm 63 moves upward and remains upward for a brief period until the volume 67 and the space 64 are charged, whereupon the spring 65 becomes effective to restore the diaphragm to its lower position.

This scheme can be used in two ways. As shown in Fig. 3 the upward motion of the diaphragm 63 closes an electric switch 69. This switch is connected across the terminals of the switch 52 so that as long as the switch 69 is closed (and it is closed only briefly at the start of an application) the opening of the switch 52 can have no effect on the energization of winding 54.

The arrangement shown in Fig. 4 is absolutely identical as to all parts bearing reference numerals up to and including 67. In Fig. 4 a switch 71 is substituted for the switch 69 and is so arranged that it is normally closed and is opened by the rise of the diaphragm 63. The switch 71 does not directly affect the action of the switch 52, but it does affect it indirectly because it is interposed in the circuit to winding 34. Thus the differential diaphragm switch in Fig. 4 inhibits excitation of the winding 34 and excitation of this winding is essential to the charging of reservoir 48, and consequently to the opening of the switch 52. The arrangements shown in Figs. 3 and 4 are functionally equivalent. Each operates successfully, and the choice between them probably depends on the relative convenience with which certain improvements subsequently invented can be incorporated in each.

In its broader aspects the invention contemplates a device which will accumulate energy at a rate determined by the frequency with which the master controller cycles under abnormal conditions and which at the same time will dissipate this energy at an approximately uniform rate. The rate of this dissipation of energy is greater than the rate of accumulation under normal conditions and less than the rate of accumulation under seriously abnormal conditions. In a pneumatic brake system it is obviously simplest to accumulate the desired energy in the form of compressed air. The concept is broader and is not necessarily restricted in this regard. When energy accumulates and develops a certain potential (i. e. pressure in the example illustrated) the device operates to apply the brakes through means present in the system. As a practical matter use is made of the application valve normally a part of the system.

The protection device according to the invention does not require the engineer to watch gages or signal lamps. It simply produces a service application and by stopping the train warns the operator that something is wrong. Since that something is on the straight-air side of the system, all that the engineer need do is to shift his change-over valve to the automatic operation setting and proceed with automatic air brakes. There will be times when it is more important to proceed at once than it is to investigate the cause of the malfunction but there is nothing in the system which prevents the engineer from searching for the cause of his difficulty if he has time to do so.

Obviously the inventive concept is capable of embodiment in a number of specifically different forms and can be applied to electro-pneumatic systems of varying types provided they include a master controller.

I claim:

1. The combination of an electro-pneumatic brake system comprising a normally vented straight-air pipe; a normally charged automatic brake pipe; control valve means for applying the brakes in response to increases of pressure in the straight-air pipe and in response to reductions of pressure in the automatic brake pipe; electrically actuated means for developing and dissipating pressure in the straight-air pipe; application valve means for dissipating the charge in the automatic brake pipe; a pneumatically actuated master controller connected in circuit with said electrically actuated means to actuate the same, and having a pneumatic follow-up means responsive to resulting pressure changes in the straight-air pipe; an engineer's brake valve connected to control said master controller; cumulative means for storing energy upon each actuation of the master controller and for dissipating said energy at rates at least equal to the maximum rate of accumulation characteristic of normal functioning of the master controller, but less than the rate of accumulation where abnormal cycling occurs; and safety means for actuating said application valve in response to abnormal accumulation of energy by said cumulative means.

2. The combination defined in claim 1 in which the cumulative means comprises a reservoir having a restricted inlet and a constantly open restricted vent, and electrically actuated valve means energized by said master controller in each functional response thereof and when energized serving to supply air under pressure to said inlet; and said safety means is responsive to the development of a predetermined pressure in said reservoir and serves to cause operation of said application valve.

3. The combination defined in claim 1 in which the cumulative means comprise a reservoir having a restricted inlet and a constantly open restricted vent, and electrically actuated valve means energized by said master controller in each functional response thereof, said valve means when energized serving to supply an increment of air under pressure to said inlet; and said safety means comprise a vent valve biased to open, an electric winding serving when energized to hold said vent valve closed, a circuit including said winding and a source of electric energy, and a pressure-responsive switch controlling the last named circuit, said switch being biased to its closed position and its pressure-responsive mechanism being subject to pressures in said reservoir acting in the switch-opening direction.

4. The combination defined in claim 1 in which the cumulative means comprise a reservoir having a restricted inlet and a constantly open restricted vent, and electrically actuated valve means energized by said master controller in each functional response thereof, said valve means when energized serving to supply an increment of air under pressure to said inlet; and said safety means comprise a vent valve biased to open, an electric winding serving when energized to hold said vent valve closed, a circuit including said winding and a source of electric energy and a pressure-responsive switch controlling the last named circuit, said switch being biased to its closed position and its pressure-responsive mechanism being subject to pressures in said reservoir acting in the switch-opening direction; and timing means are provided serving to maintain the last named circuit closed for a period measured from the initial operation of the master controller.

5. The combination defined in claim 1 in which the cumulative means comprise a reservoir having a restricted inlet and a constantly open restricted vent, and electrically actuated valve means energized by said master controller in each functional response thereof and when energized serving to supply an increment of air under pressure to said inlet; said safety means is responsive to the development of a predetermined pressure in said reservoir and is arranged to cause actuation of said application valve; and timed means are provided to inhibit operation of said electrically actuated valve means for a period measured from an initial operation of the master controller.

6. The combination of an electro-pneumatic brake system having a straight-air pipe, electrically actuated valves for controlling the pressure in said pipe and a pneumatically actuated master controller in circuit with said electrically actuated valves and having a follow-up mechanism for the controller responsive to pressures developed in the straight-air pipe, whereby the controller is rendered normally stable; electrically actuated means adapted to accumulate energy at rates determined by abnormal cyclic action of the master controller, and to dissipate said energy at a predetermined rate; brake applying means independent of said straight-air pipe; and means responsive to accumulation of energy by said electrically actuated means, beyond a predetermined limit for actuating said brake applying means.

7. The combination defined in claim 6 in which the brake applying means are so arranged as to respond to circuit failure.

8. The combination of an electro-pneumatic brake system having a straight-air pipe, electrically actuated valves for controlling the pressure in said pipe and a pneumatically actuated master controller in circuit with said electrically actuated valves and having a follow-up mechanism for the controller responsive to pressure developed in the straight-air pipe, whereby the controller is rendered normally stable; a reservoir having a restricted vent; an electrically actuated valve mechanism controlled by said master controller and arranged to deliver an increment of air to said reservoir upon each operation of the master controller; brake applying means independent of said straight air pipe; and means responsive to the development of pressure above a predetermined value in said reservoir and serving in response thereto to operate the last named brake applying means.

9. The combination defined in claim 8 in which the means responsive to the development of pressure above a predetermined value in the reservoir comprise a normally closed pressure-responsive switch, a vent valve biased to open, an electric device serving when energized to hold said vent valve closed, and an electric circuit including a source of electric energy, said electric device and said pressure-responsive switch.

10. The combination of an electro-pneumatic brake system comprising a normally vented straight-air pipe, a normally charged automatic brake pipe; normally inactive application valve means for dissipating the charge in the brake pipe; a pneumatically actuated master controller arranged to control pressure in the straight-air pipe and having pneumatically actuated follow-up means responsive to resulting pressure changes in the straight-air pipe; a control pipe for communicating controlling pressures to said master controller; a reservoir having a restricted inlet and a constantly open restricted vent; electrically controlled valve means energized by said master controller in each functional response thereof and when energized serving to deliver an increment of air under pressure to said inlet; safety means responsive to pressure in said reservoir and serving upon the development of a predetermined pressure therein to cause actuation of said application valve means; and timed switch means for suspending the operation of said electrically controlled valve means for a definite time during a sustained rise of control pipe pressure, said timed switch means comprising a timing volume in restricted communication with said control pipe, a switch, means biasing the switch closed, a double-acting motor having a movable abutment connected to actuate the switch and subject in a switch-opening direction to control pipe pressure and in a switch-closing direction to pressure in said timing volume.

JOHN VAN VARICK ELSWORTH.

REFERENCES CITED

The following references are of record in the file of this patent:

UNITED STATES PATENTS

| Number | Name | Date |
|---|---|---|
| 2,170,240 | Fitch | Aug. 22, 1939 |
| 2,256,283 | Hewitt et al. | Sept. 16, 1941 |
| 2,464,978 | Hines | Mar. 22, 1949 |